United States Patent [19]
Bierker et al.

[11] 4,043,886
[45] Aug. 23, 1977

[54] PHOTOCHEMICAL REACTOR AND IRRADIATION PROCESS

[75] Inventors: George John Bierker, Devon; Arnold Kivnick, Erdenheim, both of Pa.

[73] Assignee: Pennwalt Corporation, Philadelphia, Pa.

[21] Appl. No.: 666,816

[22] Filed: Mar. 15, 1976

[51] Int. Cl.² .............................. B01J 1/00; B01J 1/10
[52] U.S. Cl. ...................... 204/157.1 R; 204/158 R; 204/162 R; 250/527
[58] Field of Search ........ 204/158 R, 162 R, 157.1 R; 250/527

[56] References Cited
U.S. PATENT DOCUMENTS

| 3,431,188 | 3/1969 | Ito et al. | 250/527 |
| 3,554,887 | 1/1971 | Feehs | 250/527 |

*Primary Examiner*—Howard S. Williams
*Attorney, Agent, or Firm*—Charles N. Quinn

[57] ABSTRACT

A photochemical reactor and processes for irradiation of fluid reactants for production of products by radiation catalysis are provided. The reactor is particularly adapted for radiation catalysis of fluids which are substantially opaque to radiation and hence must be mixed thoroughly during irradiation for satisfactory radiation catalysis to occur. The processes are similarly particularly adapted for irradiation of substantially opaque fluids and provide thorough mixing of the fluid reactants.

36 Claims, 7 Drawing Figures

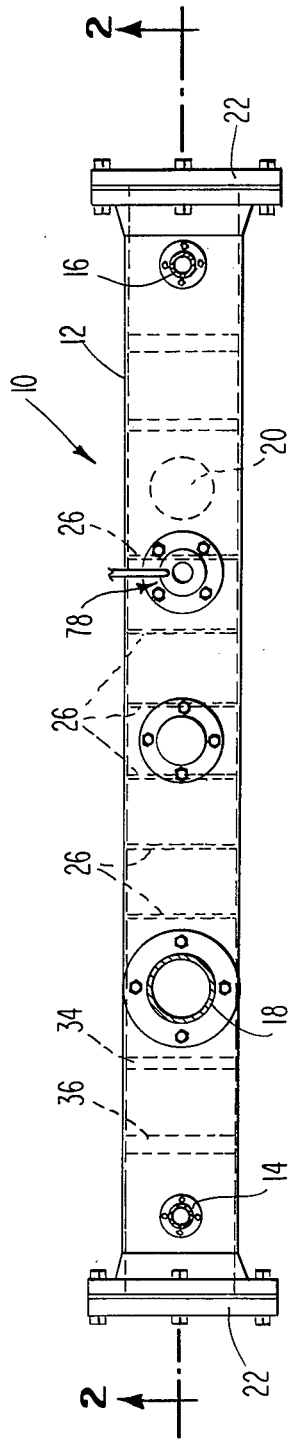
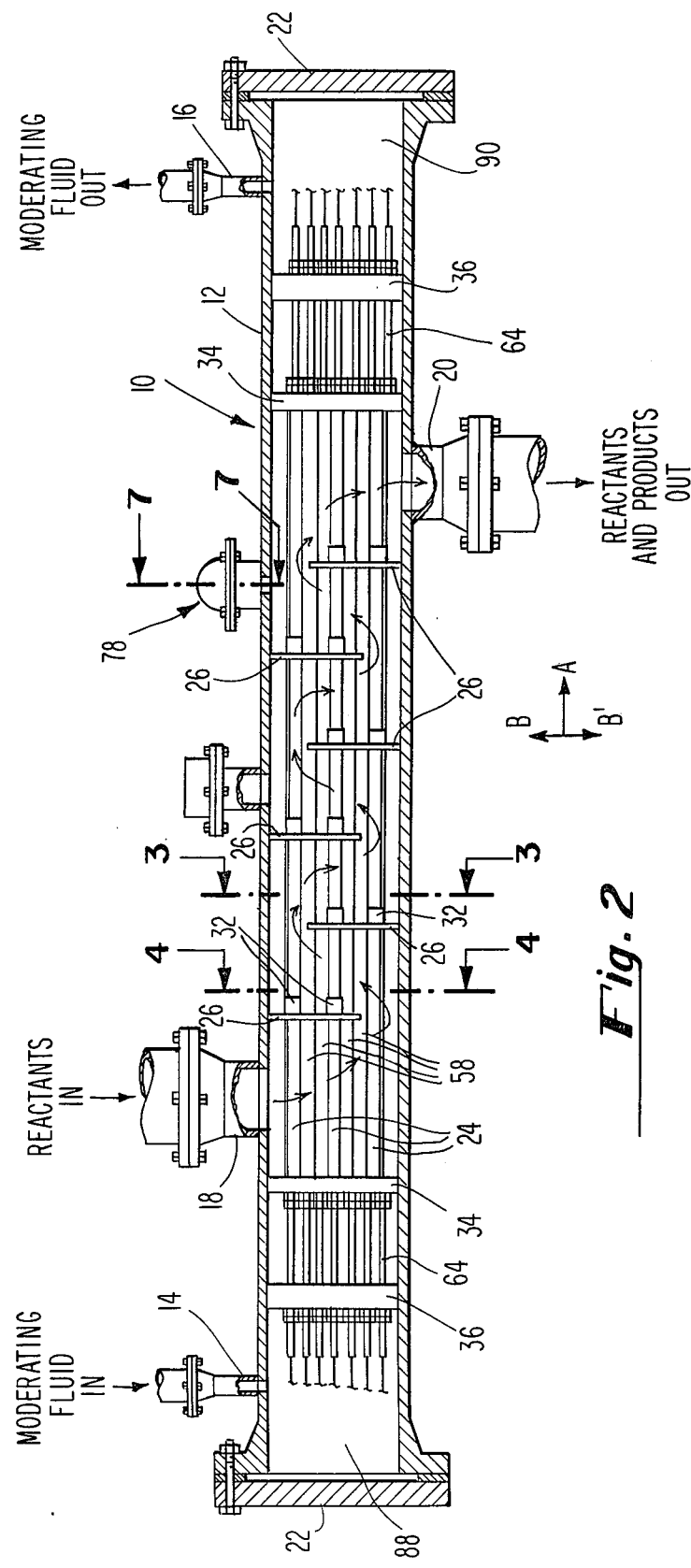

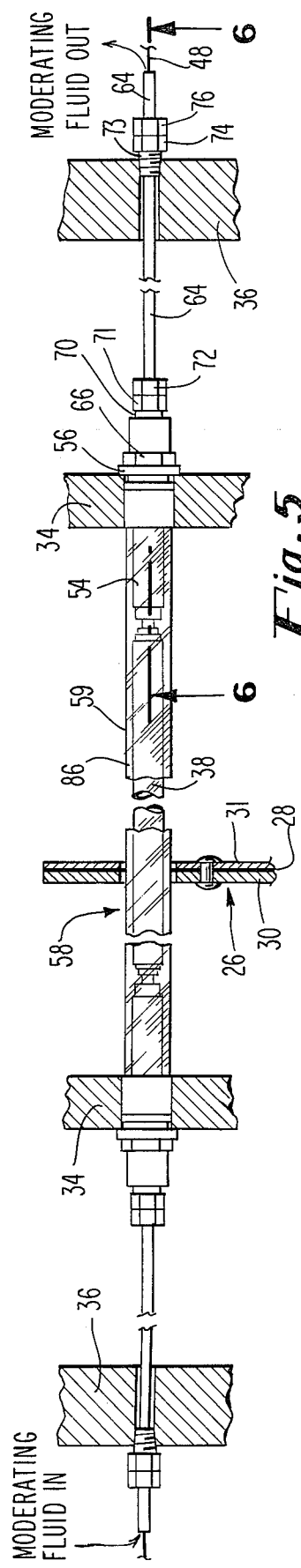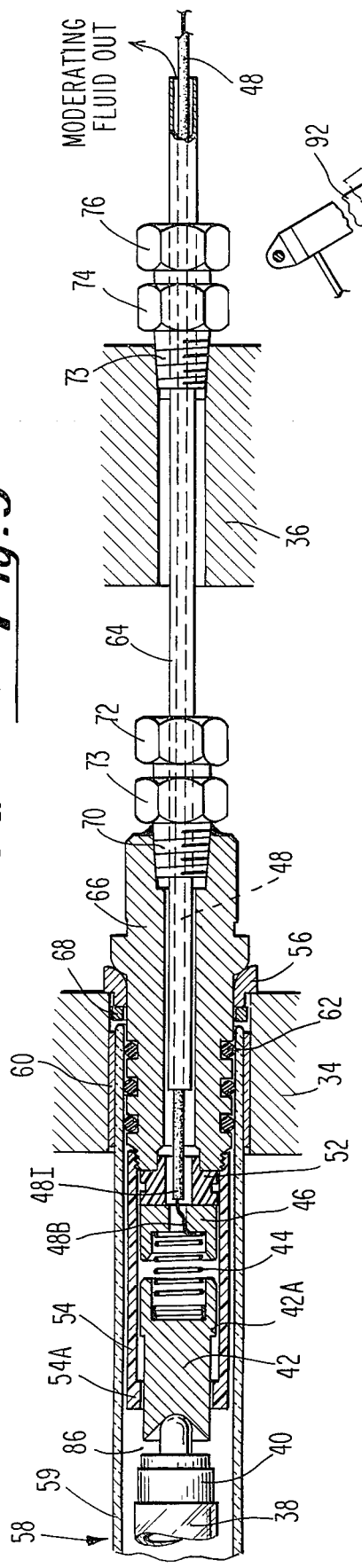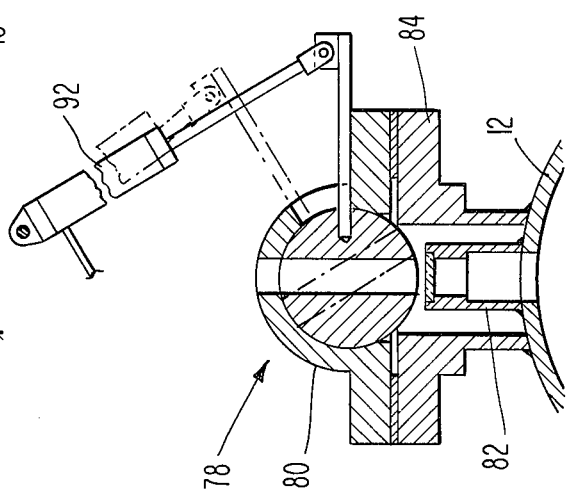

PHOTOCHEMICAL REACTOR AND IRRADIATION PROCESS

DESCRIPTION OF THE PRIOR ART

Photochemical technology heretofore has depended upon the transparency of the fluid reactants to the radiation employed. Prior art systems have sought to expose extreme depths or thicknesses of fluid to radiation. Such prior art systems have utilized processes and apparatus to reflect radiation back and forth through the fluid reactants to promote complete irradiation thereof. Agitation or mixing of the reactants in prior art reactors tends to minimize differences in the length of the flow path of various portions of fluid reactant stream as the reactants pass through the reactor. This mixing tends to improve the uniformity of exposure of the fluid reactants to radiation. Unfortunately, in prior art apparatus agitation effects upon reaction rate are minor.

The present invention provides a photochemical reactor which promotes a high degree of mixing of fluid reactants in the immediate neighborhood of a radiation source thereby increasing the reaction rate substantially over reactors known heretofore. Additionally, the present invention provides processes for radiation catalysis of fluid reactants which provide more complete radiation catalysis of the reactants than has been known heretofore due to a high degree of mixing of the fluid reactants. The present invention also provides a photochemical reactor which is safer and more reliable than those available heretofore due to isolation of radiation sources from the fluid reactants by an at least translucent barrier and, in one embodiment, the presence of a moderating fluid interposed between radiation sources and the reactant fluid.

FIELD OF THE INVENTION

The present invention is in the field of photochemical technology and more particularly is in the field of reactors and processes for practice of photochemical reactions. The present invention specifically provides a reactor for radiation catalysis of fluids which are substantially opaque to radiation. The present invention also provides processes for radiation catalysis of reactants which are substantially opaque to radiation.

It is a principal to object of the present invention to provide a photochemical reactor and processes for radiation catalysis of fluid reactants which are particularly adapted for efficient performance of the photochemical reaction.

It is a further object of the present invention to provide a photochemical reactor and processes for practice of a photochemical reaction which are particularly adapted for irradiation of a fluid substantially opaque to radiation, thereby promoting radiation catalysis of the reactant fluid.

It is a further object of the present invention to provide a photochemical reactor in which a high degree of mixing of the reactant fluid takes place in the immediate neighborhood of a radiation source.

It is a further object of the present invention to provide a photochemical reactor which is safer than those known heretofore, in which effects of breakage of a radiation source are minimized and substantially confined to the inside of the reactor.

It is a further object of the present invention to provide a photochemical reactor which uses more efficient radiation sources than used heretofore in photochemical reactors.

It is a further object of the present invention to provide a photochemical reactor in which the radiation source operating temperature is in the neighborhood of the fluid reactant temperature thereby minimizing heat transfer through any barrier between the radiation source and the fluid reactants thereby minimizing thermal stress within the barrier.

These and other objects of the present invention will become apparent to those of skill in the art from a reading of the following specification and the attached claims and an inspection of the accompanying drawing figures.

The present invention accomplishes these objects by providing a photochemical reactor and processes for radiation catalysis of a fluid with greater mixing of the reactant fluid in the neighborhood of the radiation source and therefore greater exposure of a substantially opaque reactant fluid to radiation than has been known heretofore.

BRIEF DESCRIPTION OF THE DRAWINGS

FIG. 1 is a top view of the preferred embodiment of the photochemical reactor of the present invention.

FIG. 2 is a sectional view of the preferred embodiment of the photochemical reactor of the present invention, taken along the lines and arrows 2—2 in FIG. 1.

FIG. 5 is a broken sectional view of one of the radiation sources of the reactor of FIG. 1, taken along the lines and arrows 5—5 in FIG. 3.

FIG. 6 is a partial broken sectional view of apparatus used to seal a lamp within an at least translucent tube and to fasten that assembly to a fluid baffle within the reactor of FIG. 1, taken along the lines and arrows 6—6 in FIG. 5.

FIG. 7 is a sectional view of a sight glass safety apparatus provided with the reactor of FIG. 1, taken along the lines and arrows 7—7 in FIG. 2.

DESCRIPTION OF THE PREFERRED EMBODIMENTS

Figure 3:
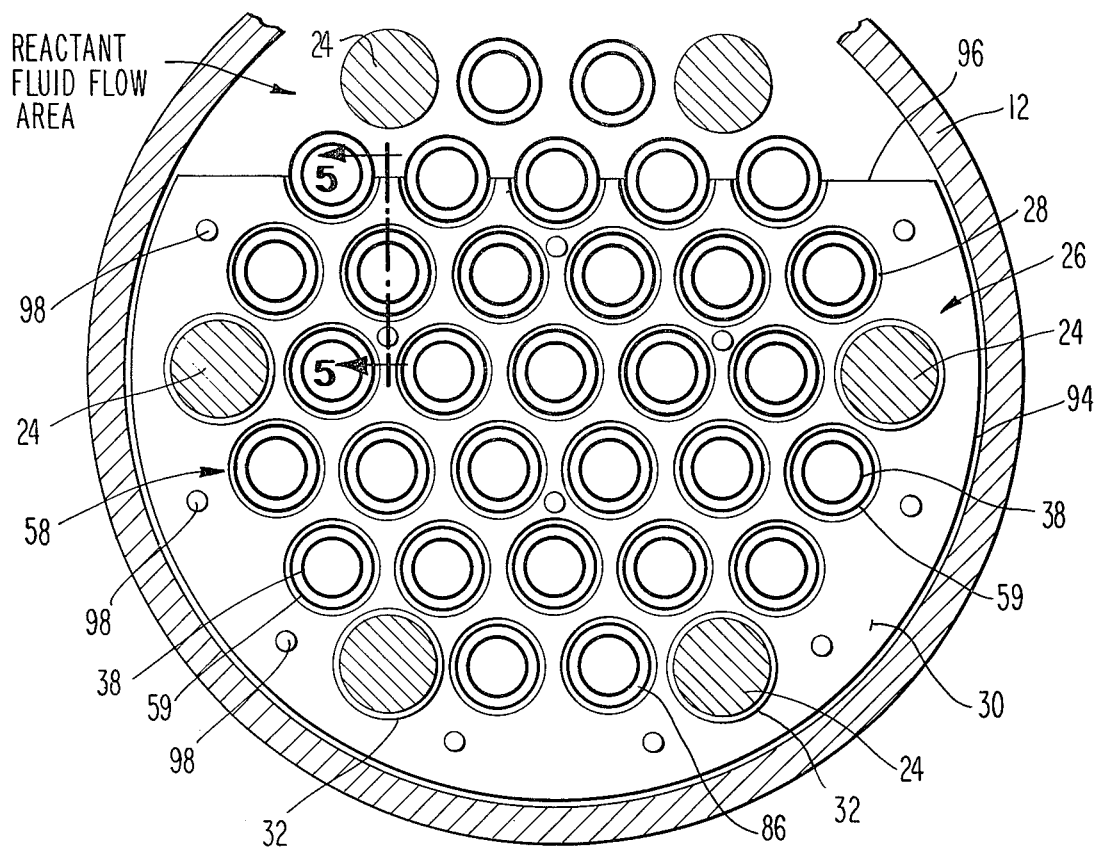
FIG. 3 is a partial broken sectional view of the preferred embodiment of the photochemical reactor of the present invention taken along the lines and arrows 3—3 in FIG. 2.

Reference is made to FIG. 1 where the preferred embodiment of the photochemical reactor of the present invention is designated 10. The periphery of the reactor is formed by shell 12 which has moderating fluid inlet and outlet ports 14 and 16 and inboard thereof has reactant fluid inlet and outlet ports 18 and 20. End plates 22 seal the ends of shell 12 with suitable nut and bolt assemblies in combination with suitable gaskets. Locations of moderating fluid inlet and outlet ports 14 and 16 and reactant fluid inlet and outlet ports 18 and 20 are not limited to those shown in FIG. 1.

Refer now to FIG. 2. Within shell 12 bulkheads 36 extend from the inner surface thereof. Wire carrying tubes 64 rigidly connect bulkheads 36 with thrust plates 34. Tie rods 24 extend from and connect together thrust plates 34 and support baffles 26. Radiation sources 58 extend longitudinally between thrust plates 34. The rigid assembly of bulkheads 36, wire carrying tubes 64, thrust plates 34 and tie rods 24 provides means for connecting shell 12 with radiation sources 58 and baffles 26 and for maintaining radiation sources 58 in spaced disposition from each other and from interior surfaces of shell 12.

Baffles 26 provide longitudinal support for radition sources 58. Each radiation source 58 extends longitudinally within shell 12 and preferably comprises at least one lamp for emitting radiation and a housing or tube preferably disposed concentrically about each set of one or more preferably coaxial lamps, with the housing at least translucent to the emitted radiation. A transparent housing is preferable but not required. A void, preferably of annular configuration, preferably separates the lamps from the housing; however a void is not required. The baffles are of sandwich construction and provide as a radiation source support a teflon sheet within the sandwich, between two preferably stainless steel plates. Ferrules 32 secure tie rods 24 and baffles 26 together.

Each baffle 26 preferably intersects a straight line path between reactant fluid inlet and outlet ports 18 and 20. When reactant fluid is passed through the shell from reactant fluid inlet port 18 to reactant fluid outlet port 20, radiation sources 58 are preferably surrounded by reactant fluid, thereby resulting in irradiation of the fluid, and each baffle 26 preferably diverts at least a portion of reactant fluid from the straight line path thus promoting mixing of reactant fluid proximate the radiation sources.

Bulkheads 36 are secured within shell 12 in fluid-tight relationship and seal off portions of shell 12 thereby forming fluid-tight chambers 88 and 90. Fluid-tight chamber 88 is a moderating fluid inlet chamber while fluid-tight chamber 90 is a moderating fluid outlet chamber. End plates 22 form portions of fluid-tight chambers 88 and 90. Sight glass assembly 78 allows visual inspection of conditions within the photochemical reactor.

With reference to the photochemical reactor, arrow A denotes an arbitrarily designated first direction which is the major direction of reactant fluid flow through the reactor. Arrow B denotes an arbitrarily designated direction transverse to first direction A. Arrow B' denotes another arbitrarily designated direction, opposite in direction to direction B, where both B and B' are transverse to first direction A. Although first direction A is shown parallel to the axis of rotation of preferably cylindrical shell 12, the processes described herein are independent of the configuration of the photochemical reactor and may be practiced with any suitable reactor configuration. the configuration shown is the preferred embodiment of the apparatus of the present invention.

In the process of the present invention, the reactants, which are generally liquid but may be in the gaseous phase, are fed in through reactant inlet port 18, preferably substantially transversely to the first direction, as shown by the arrow "Reactants In." Reactant fluid flows around tie rods 24 and around radiation sources 58, as shown by the curved arrows within reactor 10, as it passes through the reactor generally in the first direction. Reactant fluid eventually reaches reactant fluid outlet port 20 whereupon it is removed as shown by the arrow "Reactants and Products Out" preferably along a direction substantially parallel to the inlet direction. Mixing flow around radiation sources 58 is promoted by baffles 26, each of which preferably blocks a major portion of the cross sectional area of reactor 10 whereby flow of reactant fluid along a straight line from reactant fluid inlet port 18 to reactant fluid outlet port 20 is precluded. While reactant fluid is passing through the reactor generally in the first direction, the baffles result in the illustrated oscillatory reactant fluid flow pattern at angles to the first direction. As the reactant fluid flows around the baffles, a high degree of mixing takes place thereby promoting exposure of the reactant fluid to radiation from the radiation sources. The high degree of mixing of the reactant fluid is necessary since experimental data have shown that for one substantially opaque reactant fluid, $H_2S$, 99% of the radiation incident on the fluid is absorbed within one fourth of a millimeter of the fluid interface at which the radiation is applied.

Radiation catalysis of the reactant fluid takes place substantially in an irradiated zone of the reactor inboard thrust plates 34. Thrust plates 34 are not fluid-tight and reactant fluid occupies the spaces between thrust plates 34 and bulkheads 36; however substantially no radiation catalysis takes place in these areas because substantially no radiation enters these areas due to the blocking effect of thrust plates 34. As the reaction occurs, an at least translucent and preferably transparent moderating fluid, preferably gaseous nitrogen, may be fed in through moderating fluid inlet 14 to fluid-tight chamber 88 from where it would flow to fluid-tight chamber 90 and out moderating fluid outlet 16. It will be assumed for purposes of further discussion of the process that the moderating fluid is used; however it is to be understood that an embodiment of the process of the present invention may be practices without use of a moderating fluid. It is also to be understood that the moderating fluid may be statically maintained at the locations described or may be dynamically flowed through the locations described either by recirculation or by introduction of fresh fluid. Dynamic flow of the moderating fluid will be assumed for purposes of further discussion. As moderating fluid flows from chamber 88 to chamber 90, it is maintained around lamps 38 within radiation sources 58 by at least translucent tubes 59 and thereby provides a fluid medium through which radiation passes prior to irradiating the reactant fluid. Flow of moderating fluid from chamber 88 to chamber 90 preferably results in continuous replacement of moderating fluid in the preferably annular voids 86 between lamps 38 and tubes 59.

Reference is made to FIG. 3 where shell 12 is shown in section with baffle 26 installed therein. Four of six tie rods 24 pass through baffle 26. Baffle 26 is secured to the four tie rods passing therethrough by ferrules 32. Radiation emitting lamps 38 are surrounded by peferably concentrically disposed tubes 59 which peferably are quartz and which are at least translucent to radiation of the wave length emitted by lamp 38 therewithin. Lamps 38 preferably emit radiation in the ultraviolet range, with substantially all the radiation being in the wavelength band between about 2000 Angstroms and about 2900 Angstroms. Each radiation source or lamp and tube assembly is supported by radiation source support 28, preferably teflon or equivalent, the center portion of the sandwich construction of baffle 26. The sandwich is fastened together by rivets 98.

In FIG. 3, edge portion 94 of baffle 26 proximate the inner surface of shell 12 is a major or greater edge portion of the baffle while edge portion 96 of baffle 26 remote the inner surface of shell 12 is a minor or lesser edge portion of the baffle. Baffle 26 is preferably configured with the major edge portion comprising more than 50% of the total edge portion such that baffle 26 blocks more than 50% of the total reactant fluid flow area, the circular cross-sectional area within shell 12. Baffles 26 are peferably disposed at least partially transverse the radiation sources.

The reactor is constructed with radiation sources 58 closely packed together. Bunching of tubes 59 with lamps 38 therewithin is limited only by structure at either end of the lamp-tube assembly used to secure the lamp-tube assembly to thrust plates 34. In one construction of the present reactor, tubes 59 all have an outside diameter of about 1 and 3/16 inches. The distance between centers of closest adjacent tubes is about 1.48 inches, which yields a minimum distance between outer surfaces of closest adjacent tubes of bout 0.293 inches. This results in a dimensionless ratio of minimum distance between outer surfaces of most adjacent tubes to tube diameter of 0.246.

Figure 4:
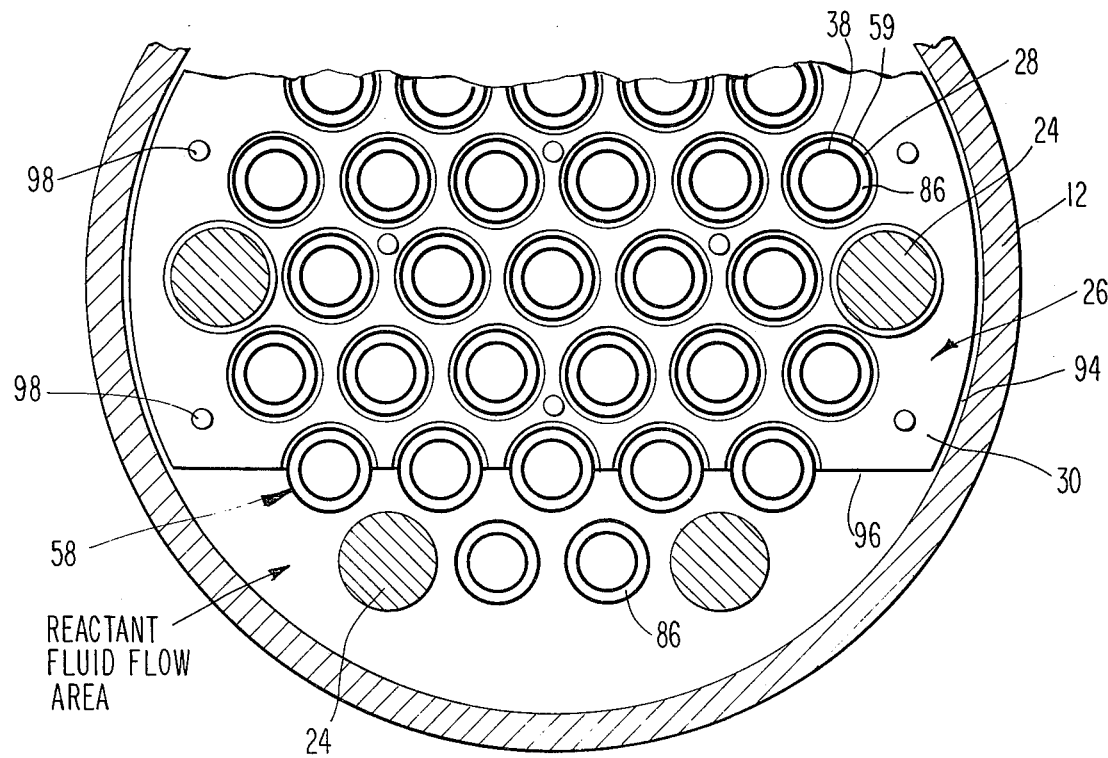
FIG. 4 is a partial broken sectional view of the preferred embodiment of the photochemical reactor of the present invention, taken along the lines and arrows 4—4 in FIG. 2.

Reference is made to FIG. 4 where another baffle 26 is shown within shell 12. The baffle in FIG. 4 is adjacent the baffle shown in FIG. 3 but has been rotated 180° with respect thereto. When reactant fluid flows through shell 12 and successively passes the baffles shown in FIGS. 3 and 4, an oscillatory pattern of reactant fluid flow across radiation sources 58 results. The cross flow results from the positioning of the reactant fluid flow areas, where no portion of a baffle is present, on opposite sides of th bundle of radiation sources for adjacent baffles. Thus for reactant fluids to flow through the reactor, it clearly must pass across radiation sources 58 at angles thereto as it proceeds from the reactant fluid flow area in FIG. 3 to the reactant fluid flow area in FIG. 4.

The geometric pattern of the radiation sources and their spacing one from another is illustrated in FIGS. 3 and 4. The radiation sources are illustrated in a triangular pattern or "pitch;" square or diamond patterns are also within the ambit of the present invention. A triangular pattern or pitch, as illustrated, results when the radiation sources are positioned with their centers at the vertices of equilateral triangles. Similarly, a square pattern or pitch, not illustrated, results when the radiation sources are positioned with their centers at the vertices of squares while a diamond pattern or pitch, also not illustrated, results when radiation sources are positioned with their centers at the vertices of imaginary diamonds.

Reference is now made to FIG. 5 wherein the preferred embodiment of the assembly of tube 59 about lamp 38, support of tube 59 by baffle 26 and structure permitting flow of moderating fluid between tube 59 and lamp 38 while lamp 38 is emitting radiation is shown. Lamp 38 is supported within tube 59 primarily by connector sleeve 54 which maintains lamp 38 remote the inner wall of tube 59 such that preferably annular void 86 is created therebetween. Connector sleeve 54 is maintained in the proper orientation, retaining lamp 38 remote the inner wall of tube 59, by bushing 56, receiver 66, fitting 70, nut 71 and safety nut 72. Wire carrying tube 64 connects void 86 with chambers 88 and 90 whereby moderating fluid may flow from chamber 88 through void 86 to chamber 90. Fittings 70 with associated hardware are used at both thrust plates 34 to maintain the lamp 38 and tube 59 assembly in supported disposition. Wire carrying tube 64 is secured to bulkhead 36 preferably in a fluid-tight manner by fastener 73, nut 74 and safety nut 76 with fastener 73 threaded into complemental threads in bulkhead 36. Wire carrying tube 64 preferably extends a short distance into chamber 88 and 90 to provide for entry and exit of purge fluid to and from the chambers from void 86. The constructions at both bulkheads 36 whereby wire carrying tube 64 is retained thereat are preferably identical. Similarly, the constructions at thrust plates 34, whereby the tube-lamp assembly is maintained thereat by suitable hardware comprising receiver 66 and associated parts, are preferably identical for each tube at each thrust plate.

Reference is now made to FIG. 6 wherein a single thrust plate 34 and bulkhead 36 are shown with the preferred assembly of apparatus for connecting and retaining wire carrying tube 64, lamp 38 and tube 59 shown in section. Lamp 38 has lamp end fitting 40 extending therefrom, contacting connector 42 for flow of electrical energy therebetween. Connector 42 is maintained within insulating connector sleeve 54, which is preferably nylon, by neck 54A of connector 54 in interfering disposition with shoulder 42A of connector 42. Spring 44 electrically connects connector 42 to wire 48, the bare portion of which is denoted 48B while the insulated portion is denoted 48I. The end of spring 44 remote connector 42 is maintained within plug contact 46 by compression forces exerted on springs 44 by plug contacts 46 at either end of lamp 38. Lamp end fitting 40, connector 42, spring 44, and plug contact 46 together comprise means for sealing lamp 38 within tube 59 in fluid-tight relation and for structurally connecting the lamp and tube assembly to thrust plate 34. Insulator 52 is provided between plug contact 46 and receiver 66 with receiver 66 threadedly connected to connector sleeve 54.

A passageway through receiver 66 has wire 48 resident therein for passage of moderating fluid therearound to void 86 between tube 59 and lamp 38. Tube 59 is secured to receiver 66 by suitable O-rings 62. Tube sleeve 60 is shrink fitted around tube 59 to maintain tube 59 in compression; this is required since the materials generally used for the at least translucent tube are generally much stronger in compression than in tension. Washer 68 separates peferably stainless steel bushing 56 from the end of tube 59. Bushing 56 has a convex spherical portion which touches a complemental convex spherical portion of receiver 66 for substantially frictionless contact therebetween. Fitting 70 threaded into receiver 66 has wire 48 and wire carrying tube 64 passing therethrough; nut 71 secures wire carrying tube 64 and fitting 70. At bulkhead 36, fastener 73 is substantially the same as fitting 70 with nut 74 corresponding to safety nut 72. This combination secures wire carrying tube 64 to bulkhead 36 in fluid-tight disposition whereby no reactant fluid can pass between wire carrying tube 64 and the nuts and fittings used to secure it to bulkhead 36.

Moderating fluid in void 86 travels between connector 42 and connector sleeve 54 into proximity with spring 44, around wire 48 and into the space between wire 48 and wire carrying tube 64. Once in that space, moderating fluid travels between wire 48 and wire carrying tube 64 until reaching the end of wire carrying tube 64 whereupon the moderating fluid is released into fluid-tight chamber 90.

The reactor may also be constructed in such a way that no moderating fluid is supplied intermediate lamps 38 and tubes 59. In such an embodiment, tubes 59 preferably are still provided preferably concentrically around lamps 38 to protect the lamps from the reactant fluid. In such embodiment, moderating fluid inlet and outlet ports 14 and 16 are eliminated and moderating fluid inlet and outlet chambers 88 and 90 are eliminated with suitable means provided for carrying the electrically conducting wires 48 to the lamps 38 through bulkheads 36. Wire carrying tubes 64 do not extend through bulkheads 36. Fluid tight seals are provided to prevent passage of reactant fluid through the annulus between wire carrying tube 64 and wire 48 thereby preventing flow of reactant fluid inside transparent tube 59 into contact with lamp 38. Alternatively, a seal can be provided at receiver 66 or in the neighborhood thereof.

Reference is now made to FIG. 7 wherein the sight glass safety assembly 78 is shown secured to shell 12. Sight glass 82 allows inspection of conditions inside the reactor while radiation catalysis is proceeding. Shield 84 is preferably welded to shell 12 about sight glass 82. Safety ball valve 80 when closed prevents escape of reactant from shell 12 upon a failure of sight glass 82. When ball valve 80 is open, a viewer may look through ball valve 80, when it is in the position shown in FIG. 7, and through sight glass 82 into the reactor. Means 92 for opening and closing safety valve 80 may be actuated by any suitable pneumatic, hydraulic or manual means. Normally ball valve 80 is in the closed position, shown in phantom lines in FIG. 7, and is opened only when an operator desires to look into reactor 10. This insures that upon any failure of sight glass 82, reactants and products do not escape from the reactor. Positive means, such as a spring, are preferably provided, to maintain ball valve 80 closed whereby the ball valve only opens upon an operator pressing a suitable actuation button. Upon release of the actuation button, the positive means closes ball valve 80 automatically.

We present the following working example of practice of the process of the present invention. Irradiation of fluid reactants for production of products by radiation catalysis was practiced using the reactor disclosed herein by providing a closed loop liquid flow system for connecting reactant fluid inlet and outlet ports 18 and 20. Provided in the closed loop were a conventional heat exchanger, a holding tank and a pump. Conventional means were provided outside the reactor for removal of a stream of reactants and products, whereupon the products were separated from the reactants.

The following table summarizes the contents of the reactant inlet fluid and the reactant and product outlet fluid for typical production practice of the process described herein.

| Component | Mol Fraction at Inlet | Mol Fraction at Outlet |
| --- | --- | --- |
| $H_2S$ | 0.8108 | 0.8107 |
| $nC_{12}$ Olefin | 0.0919 | 0.0904 |
| $NC_{12}$ Mercaptan | 0.0550 | 0.0564 |
| $nC_{12}$ Sulfide | 0.0051 | 0.0052 |
| Other | 0.0372 | 0.0373 |

The mixture feed ratio of raw $H_2S$ and olefin input was substantially stoichiometric with sufficient excess $H_2S$ to account for reactant loss. The temperatures of the reactant inlet fluid was 106° F while the temperature of the reactant and product outlet fluid was 114° F. Pressure in the reactor was 365 psia. Reactant fluid was circulated through the reactor at a rate of 500 gallons per minute; normal $C_{12}$ mercaptan was produced at a rate of 833 pounds per hour.

Removal of the product from the side stream was affected by initially vaporizing the $H_2S$. The organic portion of the reactant and product fluid was then subjected to vacuum fractionation, whereupon the mercaptan product was recovered, unreacted raw material was separately recovered and reintroduced into the system and waste was discarded.

The invention being thus described, we claim the following:

1. A process for the radiation catalyzed reaction of reactants, performed in a photochemical reactor containing a plurality of longitudinally oriented parallel spaced funicular radiation sources, comprising the steps of:
   a. passing said reactants generally longitudinally through said reactor;
   b. moving, in directions, to said skew longitudinal direction, at longitudinally spaced positions within said reactor, at least a portion of said reactants thereby producing oscillating flow at least of said portion of reactants with respect to said longitudinal direction thereby promoting mixing of said reactants as said reactants pass through said reactor; and
   c. irradiating the reactants;
   whereby a reaction product is produced.

2. The process of claim 1 wherein said irradiating step further comprises:
   d. surrounding at least one source of radiation with said reactants as said reactants pass through said reactor and
   e. irradiatig the reactants through an at least translucent moderating fluid separated from said reactants.

3. The process of claim 2 wherein said radiation sources comprise a plurality of closely packed at least translucent tubes with lamps therein and wherein said moderating fluid is maintained interior the length of said translucent tubes but exterior said lamps.

4. The process of claim 3 wherein said moderating fluid is non-reactive.

5. The process of claim 3 wherein said moving step further comprises moving, at longitudinally spaced positions along said tubes, portions of reactants passing longitudinally through said reactor, to flow at least partially at angles to said tubes, said portions of reactants thereby flowing across said tubes.

6. The process of claim 5 wherein said moderating fluid is continuously replaced.

7. The process of claim 5 wherein said moderating fluid is continuously recirculated.

8. The process of claim 5 wherein said moderating fluid is stationary with respect to said radiation sources.

9. The process of claim 5 comprising the further steps of:
   d. introducing reactants into said reactor along a direction substantially transverse said longitudinal direction, and
   e. removing reactants and products from said reactor along a direction substantially transverse said longitudinal direction.

10. The process of claim 9 wherein the reactants are hydrogen sulfide and an olefin and the reaction product is a mercaptan.

11. The process of claim 10 wherein the radiation source emis radiation having a wavelength substantially between about 2000 Angstroms and about 2900 Angstroms.

12. The process of claim 11 wherein the moderating fluid is nitrogen.

13. The process of alcim 1 wherein step (c) comprises surrounding at least one source of radiation with said reactants as said reactants pass through said reactor.

14. The process of claim 13 wherein each said radiation source comprises an at least translucent tube with a lamp therein.

15. The process of claim 14 wherein said moving step further comprises moving, at longitudinally spaced positions along said tubes, portions of reactants passing longitudinally through said reactor to flow at least partially at angles to said tubes, said portions of reactants thereby flowing across said tubes.

16. The process of claim 15 comprising the further steps of:
   d. introducing reactants into said reactor along a direction substantially transverse said longitudinal direction; and
   e. removing reactants and products from said reactor along a direction substantially transverse said longitudinal direction.

17. The process of claim 16 wherein the reactants are hydrogen sulfide and an olefin and the reaction product is a mercaptan.

18. The process of claim 17 wherein the radiation source emits radiation having a wavelength substantially between about 2000 Angstroms and about 2900 Angstroms.

19. A photochemical reactor comprising:
   a. a shell having reactant fluid inlet and outlet ports and moderating fluid inlet and outlet ports;
   b. at least one radiation source oriented along a first direction within said shell, each radiation source including:
      i. at least one lamp for emitting radiation; and
      ii. a housing, at least translucent to radiation, about said lamps;
   c. at least one baffle at least partially blockin a straight line path between said reactant fluid inlet and outlet ports;
   d. means for connecting said shell, said radiation sources and said baffles and for maintaining said radiation sources in spaced disposition from each other and from interior surfaces of said shell;
   e. means for sealing said lamps within said housings in fluid-tight relation and for structurally connecting said lamps and said housings to said radiation source space disposition means;
   f. two fluid-tight chambers separated by a reactant chamber in said shell;
   g. means for connecting the interior of said housings with each of said fluid-tight chambers for flow of moderating fluid therebetween through said housings;
wherein said shell has therethrough a moderating fluid inlet port into one of said fluid-tight chambers and a moderating fluid outlet port out of the remaining fluid-tight chamber, whereby when reactant fluid is passed through said shell from said reactant fluid inlet port to said reactant fluid outlet port, said radiation sources may be surrounded by reactant fluid and said baffles divert at least a portion of said reactant fluid around said radiation sources thereby promoting reactant fluid mixing proximate said radiation sources.

20. The photochemical reactor of claim 19 wherein at least one of said baffles is provided inboard said reactant fluid inlet and outlet ports, each baffle having a first edge portion proximate said shell inner surface and a second edge portion remote said shell inner surface.

21. The photochemical reactor of claim 20 wherein said lamp is an ultraviolet lamp and wherein said at least translucent housing is a quartz housing.

22. The photochemical reactor of claim 21 wherein said lamps and said housings have generally concentric cylindrical configurations with an annular void between said lamps and said housing, wherein said baffles are generally planar and disposed at least partially transverse said radiation sources, at least one radiation source passing through each baffle whereby when reactant fluid flows through said shell, flow about said radiation sources with reactant fluid mixing results from reactant fluid being diverted from a straight line path between said reactant fluid inlet and outlet ports by at least one baffle.

23. The photochemical reactor of claim 22 wherein there is provided a plurality of ultraviolet radiation sources closely packed together and wherein a majority of said radiation sources pass through each of said baffles, said baffles being substantially transverse to said radiation sources.

24. The photochemical reactor of claim 23 wherein said first edge portion of each baffle is a major edge portion and said second edge portion of each baffle is a minor edge portion.

25. The photochemical reactor of claim 24 wherein said housings have a square pitch pattern.

26. The photochemical reactor of claim 24 wherein said housings have a triangular pitch pattern.

27. The photochemical reactor of claim 24 wherein said housings have a diamond pitch pattern.

28. A photochemical reactor comprising:
   a. a shell having reactant fluid inlet and outlet ports;
   b. at least one radiation source oriented longitudinally within said shell, each radiation source including at least one lamp for emitting radiation;
   c. at least one baffle at least partially blocking a straight line path between said reactant fluid inlet and outlet ports, at least one of said radiation sources passing through said baffle;
   d. means connecting said shell, said radiation sources and said baffles, for maintaining said radiation sorces spaced from each other and from interior surfaces of said shell;
whereby when reactant fluid is passed through said shell, said radiation sources may be surrounded by reactant fluid and said baffles divert at least a portion of said reactant fluid across said radiation sources thereby producing at least partially oscillating flow, promoting mixing of reactant fluid proximate said radiation sources.

29. A photochemical reactor comprising:
   a. a shell having reactant fluid inlet and outlet ports and moderating fluid inlet and outlet ports;
   b. at least one radiation source oriented longitudinally within said shell, each radiation source including:
      i. an at least one funicular ultraviolet lamp; and
      ii. a generally cylindrical housing, at least translucent to radiation, concentrically spaced about said lamp;
   c. at least one inboard said reactant fluid inlet and outlet ports, at least partially blocking a straight line path between said reactant fluid inlet and outlet ports, at least one of said radiation sources passing through at least one baffle;
   d. means connecting said shell, said radiation sources and said baffles, for maintaining said radiation sources in spaced disposition from each other and from interior surfaces of said shell;
   e. means for sealing said lamps within said housings in fluid-tight relation;

f. means for fluidically connecting spaces between said housings and said lamps with said moderating fluid inlet and outlet ports for flow of moderating fluid through said spaces within said housings;

whereby when reactant fluid is passed through said shell from said reactant fluid inlet port to said reactant fluid outlet port, said radiation sources may be surrounded by reactant fluid with said baffles diverting reactant fluid over said radiation sources thereby producing at least partially oscillating flow of reactant fluid promoting reactant fluid mixing proximate said radiation sources.

30. The photochemical reactor of claim 29 wherein each said lamp extends substantially the length of said housing surrounding said lamp and wherein said housing is quartz.

31. The photochemical reactor of claim 30 wherein each radiation source consists of a single lamp surrounded by a concentric housing wherein there are a plurality of generally planar baffles disposed at least partially transverse said radiation sources, spaced longitudinally along said radiation sources between said reactant fluid inlet and outlet ports, at least some of said baffles partially blocking a straight line path between said reactant fluid inlet and outlet ports, for displacing reactants passing longitudinally through said reactor alternately in directions skew to said longitudinal direction thereby producing oscillating flow over said radiation sources.

32. A photochemical reactor comprising:

a shell having reactant fluid inlet and outlet ports;

b. a plurality of parallel ultraviolet radiation sources closely packed together longitudinally oriented within said shell, each including a cylindrical ultraviolet lamp within a concentric cylindrical quartz housing at least translucent to radiation, said housing spaced about said lamps to provide annular voids therebetween;

c. a plurality of generally planar baffles substantially transverse said radiation sources, at least one baffle at least partially blocking a straight line path between said reactant fluid inlet and outlet ports, each baffle having a first edge portion proximate said shell inner surface and a second edge portion remote said shell inner surface;

d. means connecting said shell, said radiation sources and said baffles, for maintaining said radiation sources spaced from each other and from interior surfaces of said shell; and e. means for sealing said lamps within said housings;

wherein a majority of said radiation sources pass through each of said baffles, whereby when reactant fluid flows through said shell, flow about said radiation sources with reactant fluid mixing results from reactant fluid being diverted from a path through said shell in the longitudinal direction by encounter with at least one of said baffles.

33. The photochemical reactor of claim 32 wherein said first edge portion of each baffle is a major edge portion and said second edge portion of each baffle is a minor edge portion.

34. The photochemical reactor of claim 33 wherein said housings have a square pitch pattern.

35. Th photochemical reactor of claim 33 wherein said housing have a triangular pitch pattern.

36. The photochemical reactor of claim 33 wherein said housings have a diamond pitch pattern.

* * * * *

UNITED STATES PATENT OFFICE
CERTIFICATE OF CORRECTION

Patent No. 4,043,886         Dated Aug. 23, 1977

Inventor(s) George John Bierker, Arnold Kivnick

It is certified that error appears in the above-identified patent and that said Letters Patent are hereby corrected as shown below:

In the Claims:

Claim 2;line 6: irradiatig should be irradiating
Claim 11; line 2: emis should be emits
Claim 13; line 1: alcim should be claim
Claim 13; line 1: comprises should be further comprises
Claim 19; line 10: blockin should be blocking
Claim 29; line 10: inboard should be baffle inboard
Claim 35; line 1: Th should be The
Claim 35; line 2: housing should be housings Signed and Sealed this Twenty-ninth Day of November 1977

[SEAL]

Attest:

RUTH C. MASON
*Attesting Officer*

LUTRELLE F. PARKER
*Acting Commissioner of Patents and Trademarks*